(12) United States Patent
Kornbluh

(10) Patent No.: US 8,478,819 B1
(45) Date of Patent: Jul. 2, 2013

(54) AUTOMATICALLY INITIATING A PROCESS BY THE OUTCOME OF A VOTING CONFERENCE

(75) Inventor: Dennis C. Kornbluh, Lincoln, NE (US)

(73) Assignee: Avaya Inc., Basking Ridge, NJ (US)

(*) Notice: Subject to any disclaimer, the term of this patent is extended or adjusted under 35 U.S.C. 154(b) by 420 days.

(21) Appl. No.: 11/860,692

(22) Filed: Sep. 25, 2007

(51) Int. Cl.
*G06F 15/173* (2006.01)
*G06F 11/00* (2006.01)
*H04L 12/16* (2006.01)

(52) U.S. Cl.
USPC .................. 709/204; 370/260; 705/12

(58) Field of Classification Search
USPC .. 379/202, 260, 202.01, 93.21, 158; 709/220, 709/204; 370/260
See application file for complete search history.

(56) References Cited

U.S. PATENT DOCUMENTS

| | | | | |
|---|---|---|---|---|
| 5,995,951 A * | 11/1999 | Ferguson | | 706/10 |
| 7,055,742 B2 * | 6/2006 | Sinha | | 235/386 |
| 2002/0169756 A1 * | 11/2002 | Biddulph | | 707/3 |
| 2004/0199580 A1 * | 10/2004 | Zhakov et al. | | 709/204 |
| 2005/0015444 A1 * | 1/2005 | Rambo | | 709/204 |
| 2007/0058796 A1 * | 3/2007 | Schmidt et al. | | 379/202.01 |
| 2008/0065998 A1 * | 3/2008 | Brown et al. | | 715/755 |
| 2008/0117839 A1 * | 5/2008 | Raju et al. | | 370/261 |
| 2009/0016514 A1 * | 1/2009 | Miller et al. | | 379/202.01 |

OTHER PUBLICATIONS

"Avaya Communications Process Manager", Fact Sheet, Feb. 2007, 2pp., Avaya Inc.
"Avaya Communications Process Manager", Release 2.0, Installation and Configuration Guide, Document No. 04-601158, Apr. 2007, pp. 7-20, Issue 2, Avaya Inc.
"New conference call voting system developed", Dispute Resolution Journal, Aug.-Oct. 2002, 1p., American Arbitration Association.
"Conference Voting Systems", www.conferencesystems.com/html/voting_content.html, 2 pp., Conference Systems, Inc., Mar. 26, 2007.

* cited by examiner

*Primary Examiner* — Asad Nawaz
*Assistant Examiner* — Joel Hamel
(74) *Attorney, Agent, or Firm* — Sheridan Ross P.C.

(57) ABSTRACT

A voting application is integrated into a conference application to create a voting conference, and the conference outcome automatically initiates a process that is a function of the outcome.

13 Claims, 5 Drawing Sheets

FIG. 4

```
<ConferenceStartRequest>
    <conferenceId>987654321</>  ⟵ 401
    <requester>bob</>  ⟵ 402
    <participantList>name, name...</>  ⟵ 404
    <decisionMakerList>name, name...</>  ⟵ 406
    <subject>Decide whether to close the building due to snow</>  ⟵ 408
    <decisionList id="root">  ⟵ 412
        <decisionList id="list1" text="Snow Day Decision">  ⟵ 413
            <choice id=1 text="Close office" code="close"/>  ⟵ 414
            <choice id=2 text="Delayed opening" code="delay" link="list2"/>  ⟵ 414
                                                                    420
            <choice id=3 text="Normal hours" code="normal"/>  ⟵ 414
                    416        418
        </>
        <decisionList id="list2" text="Hours to Delay">  ⟵ 413
            <choice id=1 text="1 hour" code="1h"/>  ⟵ 414
            <choice id=2 text="2 hours" code="2h"/>  ⟵ 414
                                            420
                    416        418
        </>
    </>
</ConferenceStartRequest>
```

```
<ConferenceOutcomeEvent>
    <conferenceId>987654321</>  ~ 401
    <decisionMaker>bob</>  ~ 502
    <decision sourceid="list1">delay</>  ~ 604
</ConferenceOutcomeEvent>
```
500

FIG. 6

```
<ConferenceOutcomeEvent>
    <conferenceId>987654321</>  ~ 401
    <decisionMaker>bob</>  ~ 502
    <decision sourceid="list2">2h</>  ~ 504
</ConferenceOutcomeEvent>
```
600

AUTOMATICALLY INITIATING A PROCESS BY THE OUTCOME OF A VOTING CONFERENCE

TECHNICAL FIELD

This invention relates generally to communications conference systems.

BACKGROUND OF THE INVENTION

Existing communications systems are able to notify individuals of an impending conference call and enroll the individuals in the conference call as participants. An illustrative example thereof is disclosed in U.S. Pat. No. 5,544,237.

The American Arbitration Association's *Dispute Resolution Journal* (August-October 2002) reports development of a conference call/interactive voice response voting system. The article describes the system as follows: The system uses personal identification numbers for authentication and allows for an unlimited amount of discussion. At any point in the discussion, a vote can be called for, and members are prompted to vote by pressing keypad keys on their phones, then either confirm the vote or vote again. The system provides confidentiality by temporarily disconnecting the voter from the call. The call is moderated by a moderator who directs the conference and provides tallies. Vote totals are tabulated in real time and made available to the moderator at the end of each voting cycle.

The Communications Process Manager of Avaya Inc. enables integration of intelligent communications into business applications and processes. Among services that it provides are a "Notify & Respond Service" that notifies users about a business event and prompts for a response, which can then be sent back to the originating application to trigger other activities, such as escalations or delegations, and a "Notify & Conference Service" that sends a notification to designated recipients inviting them to join a conference and places responding recipients into the conference. These are separate services that do not enable the outcome of a conference to be collected while the conference call is in progress. Rather, after a conference created by the Notify & Conference Service has ended, the Notify & Respond Service must send additional notifications to conference participants to gather the outcome of the earlier conference.

SUMMARY OF THE INVENTION

According to an aspect of the invention, a conference is created in response to receipt of an event. In the conference, the participants are informed of a plurality of choices, and their selections of the choices are determined. An outcome is determined from those selections, and a process that is a function of the outcome may be performed. Either a subset of the participants or all participants (as would be typical in a voting or polling application) are specified as decision-makers. The decision-makers make decisions that are used to determine the outcome of the conference. The conference thus becomes a function that is a part of a larger process of responding to the event.

According to another aspect of the invention, there is defined a message protocol that enables the conference to be started with a list of the plurality of choices (or a reference to such a list), a list of the participants, and a list of the decision-makers, and that also enables the selections of the choices to be reported out of the conference. The human decisions are thus codified and become return values which the larger process may use in its logical flow.

The invention may be implemented as a method, an apparatus for performing the method, or a computer-readable medium containing instructions which, when executed by a computer, cause the computer to perform the method.

BRIEF DESCRIPTION OF THE DRAWING

These and other features and advantages of the invention will become more apparent from considering the following description of an illustrative embodiment of the invention together with the drawing, in which:

FIG. 4 is a block diagram of an illustrative conference start request message of the system of FIG. 1;

FIG. 5 is a block diagram of an illustrative conference outcome event message of the system of FIG. 1 at a first level of a decision tree of the request of FIG. 4; and FIG. 6 is a block diagram of an illustrative conference outcome event message of the system of FIG. 1 at a second level of the decision tree of the request of FIG. 4.

DETAILED DESCRIPTION

Figure 1:
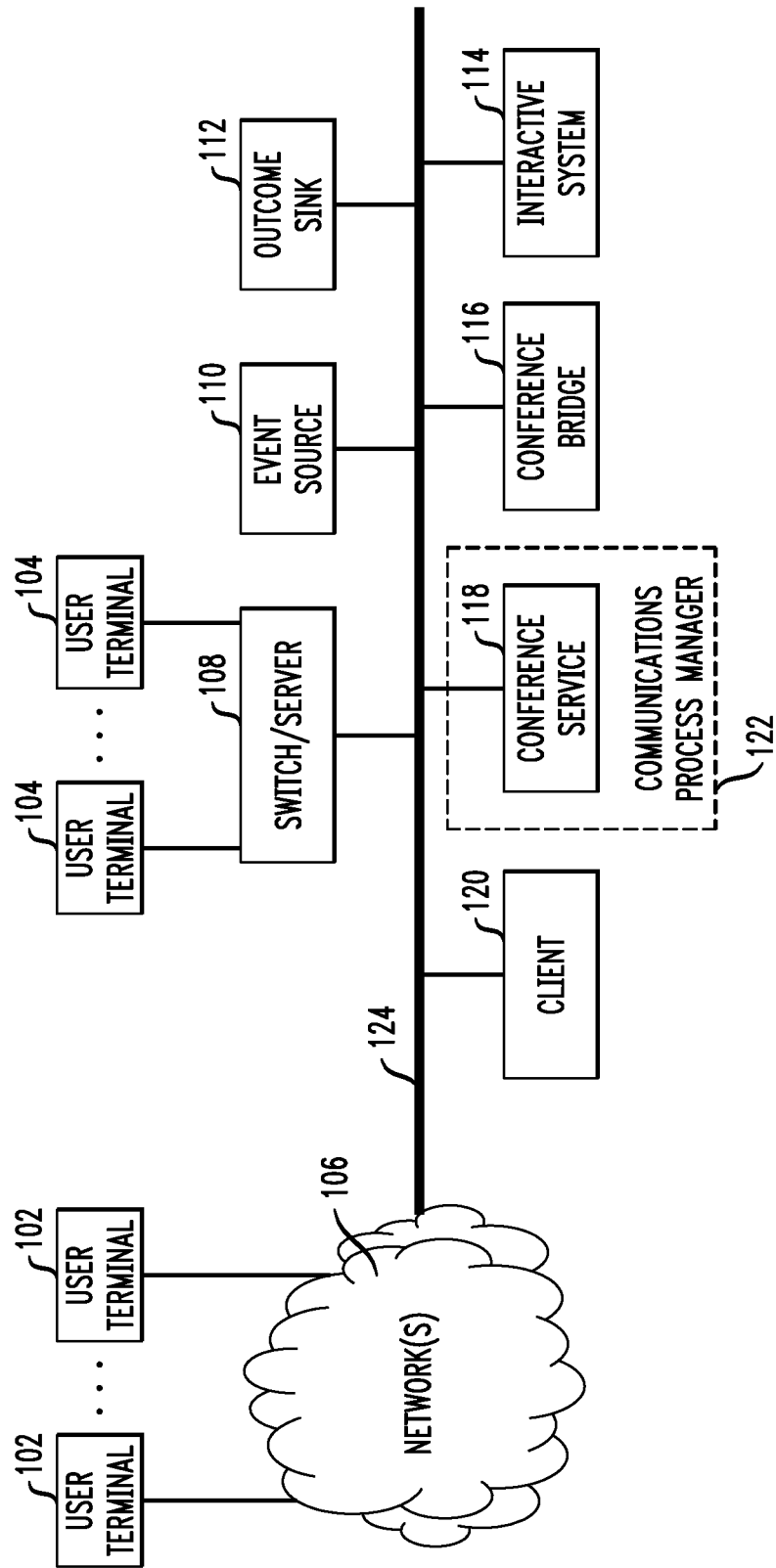
FIG. 1 is a block diagram of a communications system that includes an illustrative embodiment of the invention.

FIG. 1 shows an illustrative communications system 100. System 100 includes a plurality of user communications terminals 102, 104. These may be any desired kind of communications terminals, such as standard telephony telephone sets, cell phones, Voice over the Internet Protocol (VoIP) telephones, personal digital assistants (PDAs), personal computers with or without softphones, etc., or any combination thereof. Remote user terminals 102 are interconnected by one or more communications networks 106. For example, some remote user terminals 102 may be interconnected by the public service telephone network, while other remote user terminals 102 may be interconnected by a wide-area network (WAN) such as the Internet. Local user terminals 104 located on an enterprise (private) network may be interconnected with networks 104 via a switch/server 108. If local user terminals 104 are conventional telephony terminals, switch/server 108 is illustratively a switching system such as a private branch exchange (PBX). If local user terminals 104 are data terminals, including VoIP terminals, switch/server 108 is illustratively a conventional router or gateway. In either case, switch/server 108 may be the Avaya Communications Manager, for instance.

System 100 further includes an event source 110 and an outcome sink 112. An event can be any conceivable occurrence. An outcome is a result of a decision process triggered by the event. Event source 110 reports the event that triggers the conference to be initiated, and outcome sink 112 acts on the result of the conference.

For purposes of effecting the decision process, system 100 includes an interactive system 114 that can automatically interact with users of user terminals 102, 104, such as an interactive voice response system (IVR); a conference bridge 116 for creating conference connections between pluralities of user terminals 102, 104; a conference service that controls conference bridge 116 and sets up conferences; and an entity, referred to herein as a client 120, that communicates with event source 110 and outcome sink 112 and creates and controls the decision process. Illustratively, conference service 118 and/or client 120 comprise outcome sink 112. Entities 112, 114, 118, and 120 illustratively are stored-program-controlled entities comprising a storage medium storing the programs and a processor for executing the programs. Entities 112, 114, 118, and 120 may share one or more storage media and processors, or each may have its own. Illustratively, interactive system 114 is the Avaya Voice Portal, conference bridge 116 is the Avaya Meeting Exchange Express, and conference service 118 is a component of the Avaya Communications Process Manager (CPM) 122. Client 120 comprises the business process entity which coordinates exchanges of information between networked entities through Web-Service interactions. Networks 106 and entities 108-120 are interconnected by a communications medium 124, such as a local area network (LAN). Illustratively, system 100 follows the precepts of Service-Oriented Architecture (SOA).

As described so far, system 100 is conventional.

According to an aspect of the invention, the decision process that is executed in response to an event to generate an outcome is a decision-collection conference. Both the decision-makers (conference participants who have the power to select an outcome) and the possible outcomes of the decision-making process are predetermined. Illustratively, the possible outcomes take the form of a decision tree comprising a hierarchy of possible outcomes, wherein possible outcomes at tree nodes that are higher in the hierarchy predetermine possible outcomes at tree nodes that are lower in the hierarchy and thereby result in a directed dialog. At each node in the tree, the dialog may announce the context (i.e., where the current node is in the tree) and the choices to be made at that node, either to decision makers alone, or to all participants, according to the parameters of the request. The decision tree may be updated or replaced during the conference via a web service message, as conference service 118 deems necessary. It is also possible to have more than one decision tree. Each tree is named and selectable by the decision maker(s). An example is a decision tree that is used to invite other participants to join the conference, as opposed to one that is used to select the primary outcome. It is up to conference service 118 and/or client 120 to make sense of the events that result.

The precise moment when decision-makers are allowed to supply responses during the conference may be determined by the mode in which the conference is initiated. In "moderator-initiated response" mode, the moderator will provide a signal that will initiate the polling of decision-makers. In "free response" mode, decision-makers may provide the signal themselves to begin supplying responses.

The ultimate outcome of response collection may cause a process that is a function of the outcome to be performed. Specifically, the ultimate outcome is reported to outcome sink 112, which performs the process that is a function of the outcome. The voting conference thus becomes a function that is a part of the larger process of responding to the event.

The conference request may specify that decision-makers and their decisions are to remain anonymous, in which case user information normally found in response events would be absent.

According to another aspect of the invention, there is defined a message protocol that enables conference bridge 116 to start a conference with a list of possible outcomes and a list of participants who are authorized to choose one or more of the outcomes (the decision-makers). It further defines a conference outcome event message that enables conference service 118 to report out the responses provided by decision-makers. The human decisions are thus codified and become return values which a larger process may use in its logical flow.

Figure 2:
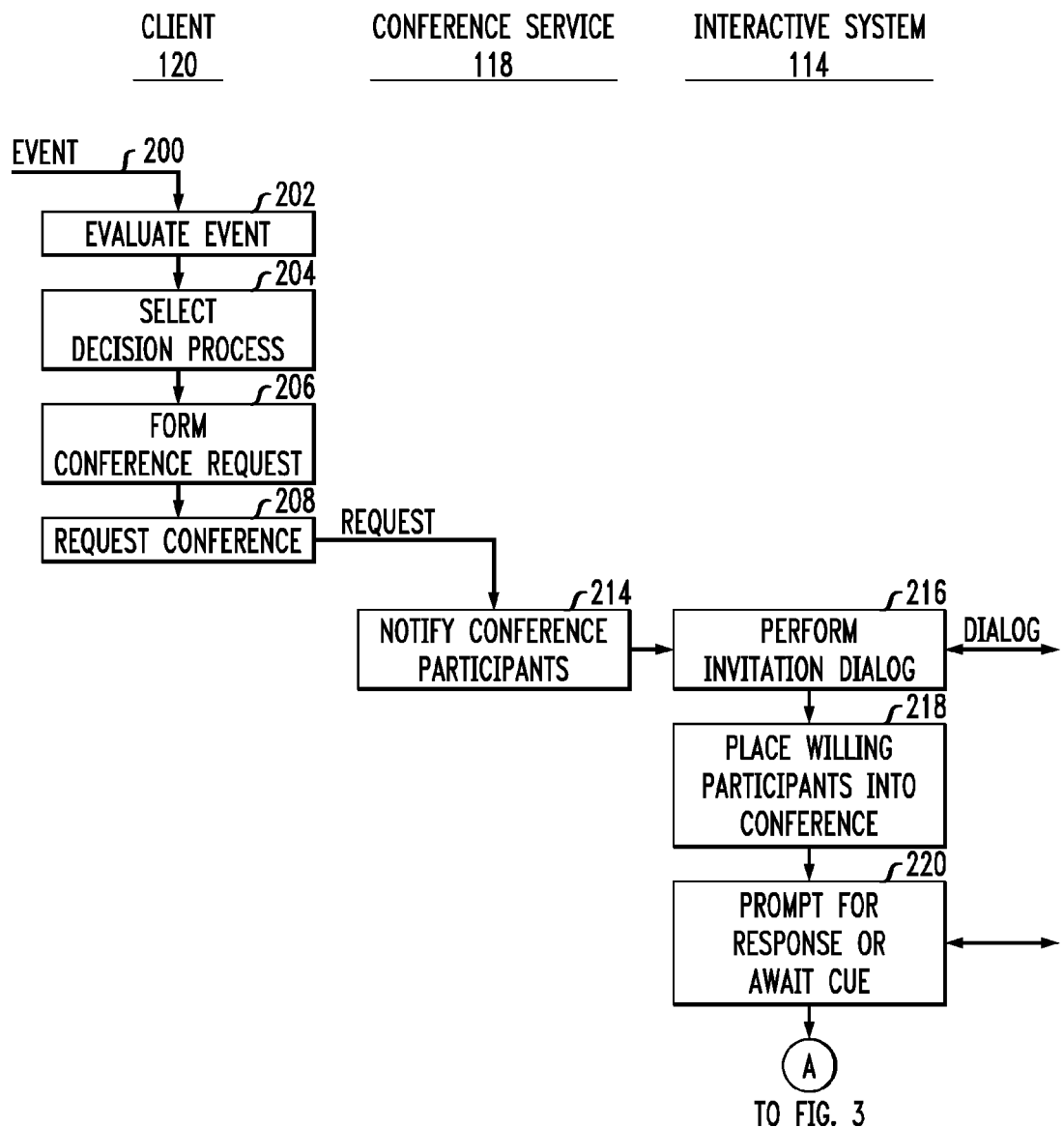
FIGS. 2 and 3 are diagrams of functionality of a client (i.e., the initiator of the conference service), a conference service; and an interactive system.
Figure 3:
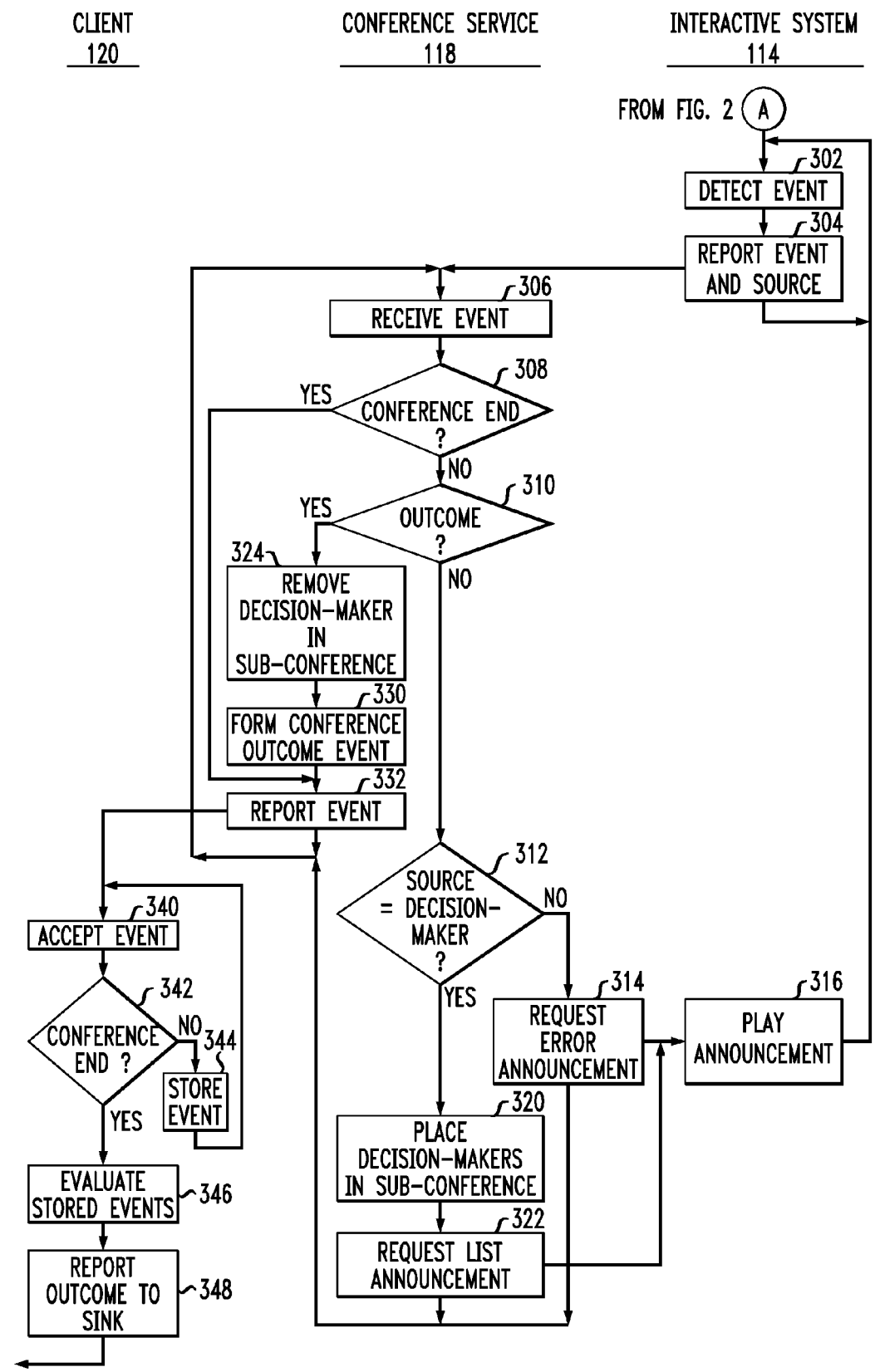

The decision process is illustrated in FIGS. 2-3. In response to receipt of an event from event source 110, at step 200, client 120 evaluates the event, at step 202, to determine which decision process to execute. It will be understood that different events require different responses, and consequently require different decision processes to be executed. Based on the evaluation, client 120 selects a decision process, at step 204, and forms a conference request corresponding to that process, at step 206.

An illustrative form of a conference request is shown in FIG. 4. The illustrative conference request takes the form of an XML message 400 that specifies the conference identifier 401, the conference requester 402, which represents the person or system responsible for responding to the event, a list of the conference participants 404, a list of the decision-makers 406, a subject 408 that describes the purpose of the conference, and a decision list 412 that specifies the decision tree in terms of the choices 414 that the decision-makers can make at any level 413 of the decision tree hierarchy. Alternatively, instead of including decision list 412, message 400 may include a Uniform Resource Identifier (URI) that points to a particular dialog on any system that is capable of serving the XML message that constitutes a decision list 412. Each choice 414 comprises a choice ID 416, a text 418 that is descriptive of the choice, and a choice code 420 that represents the choice.

Having formed conference request 400 at step 206, client 120 sends the request to conference service 118, at step 208. In response, conference service 118 sets up and sends a conference notification, at step 214, in a conventional manner, illustratively via the "Notify & Conference Service" of the Avaya CPM. Inter alia, as a part of setting up the conference notification at step 214, conference service 118 invites the conference participants listed in participant list 404 of conference request 400 with the aid of interactive system 114. Conference service 118 requests interactive system 114 to play an announcement to the participants informing them of conference requester 402 and conference subject 408, and, optionally, of a code (e.g., a special key sequence) that a decision-maker can enter to signal readiness to make a decision. Interactive system 114 plays the announcement, at step 216, which invites the participant to join the conference, and collects their responses. Willing participants are then transferred into the conference at step 218.

At this stage, one or more participants are presumed to be in conference. Of the participants, one or more are presumed to be decision-makers. In moderator-initiated response mode, decision-makers may be prompted by interactive system 114 to supply a response, at step 220. In free-response mode, decision makers may enter the special key sequence or speak a command (if ASR is used) on terminal 102, 104 as a cue signaling readiness to engage in the decision-making process, at step 220.

When it detects the cue, at step 302, interactive system 114 notes the source terminal 102, 104 of the cue. Interactive system 114 then reports detection of the cue and its source to conference service 118, at step 304. Conference service 118 receives the report of the event, at step 306, and checks if it is a conference termination event, at step 308. If not, conference service 118 checks if it is a conference outcome selection event, at step 310. If not, it is a report of the cue having been detected, and conference service 118 checks the source against list of decision-makers 406, at step 312, to confirm that it was entered by one of the specified decision-makers. If the cue was not entered by a decision-maker, conference service 118 requests, at step 314, interactive system 114 to play to the conference participants an error announcement informing them that only decision-makers are authorized to enter the cue, and interactive system 114 does so, at step 316. Conference service 118 then returns to await a next event report from interactive system 114.

If it determines at step 312 that the cue was entered by a decision-maker, conference service 118 places the decision makers into a sub-conference, at step 320. Conference service 118, which is in possession of decision list 413, then requests interactive system 114 to announce list 413 to the conference participants, at step 322, and interactive system 114 does so, at step 316. Alternatively, the announcement and the decision-maker dialog may be played only to the decision-makers. Also, while the dialog is being played and during response collection, the volume of the on-going conference dialog may be lowered for the decision-makers. Conference service 118 then returns to step 306.

When a decision-maker makes a selection from list 413, by either pressing a key on his or her terminal 102, 104 or speaking the selection, interactive system 114 detects the selection and determines its source, at step 302. Interactive system 114 then reports the selection and its source to conference service 118, at step 304. Conference service 118 received the report, at step 306, and determines that it is a report of a conference outcome event, at step 310. In response, conference service 318 removes the source decision-maker from the sub-conference, at step 324, whereupon the source participant resumes the main conference and forms a conference outcome event based on the report, at step 330.

An illustrative form of a conference outcome event is shown in FIGS. 5 and 6. The illustrative conference outcome event takes the form of an XML message 500 or 600 that specifies the conference ID 401, the decision-maker 502 that made the selection, and his or her selection 504 or 604 in the form of one of the codes 420. FIG. 5 shows an illustrative outcome event at a first level 413 of the decision tree of the request of FIG. 4, while FIG. 6 shows an illustrative outcome event at a second level 413 of the decision tree.

Having formed conference outcome event at step 330, conference service 118 sends it to client 120, at step 332. Conference service 118 then returns to step 306.

Client 120 receives the event, at step 340, and checks if it is a conference termination event, at step 342. If not, client 120 stores the event, at step 344, and returns to step 340 to wait for additional events to accumulate while the conference is in progress.

Once the conference is terminated by its participants, a conference termination event is sent to conference service 118. Conference service receives it, at step 306, recognizes it, at step 308, and reports it to client 120, at step 332.

When client 120 receives a conference termination event from conference service 118, at step 340, it recognizes it, at step 342, and in response it evaluates the stored events, at step 346. The evaluation involves interpreting the events to determine the outcome of the decision process. The outcome may be indeterminate, for example, if there is a tie or if a majority of the decision-makers have not provided a response. Client 120 then reports the outcome to outcome sink 112, at step 348. The report may constitute merely an indication of the result of response collection, or it may be a command to perform an action that corresponds to the result of the voting in the decision process.

To illustrate use of system 100, consider a business process wherein a decision must be made whether or not to close a facility due to inclement weather. When certain weather conditions, such as a winter storm, occur, a weather monitoring system acting as event source 110 reports the storm and zip codes affected thereby. Client 120 receives the report and determines if the affected zip codes include the subject facility. If so, client 120 causes conference service 118 to join managers at the facility into a conference to decide whether or not to close the facility. Possible outcomes of the conference may be to (1) close the facility, (2) delay opening of the facility, or (3) do nothing. If the outcome is to delay opening of the facility, further possible outcomes are the number of hours to delay (e.g., to delay the opening by either one or two hours). This is illustrated in FIGS. 4-6. Interactive system 114 presents the possible outcomes to the managers and reports their votes through conference service 118 to client 120. If the outcome is either to close the facility or to delay its opening, client 120 communicates this outcome to a notification system, such as a public announcement system or a "reverse-911" system of the facility, which acts as outcome sink 112 and notifies occupants of the facility of the closure or delayed opening.

Of course, various changes and modifications to the illustrative embodiment described above will be apparent to those skilled in the art. For example, the process that is initiated by the conference outcome may be any desired process and not just a communication process—for example, the changing of a document's contents, a workflow, altering the parameters of the conference (e.g. "switch to lecture mode"), ordering an evacuation, placing an order for parts, voting on whether to hire a candidate, helping a game show contestant with a difficult question, and so on. Such changes and modifications can be made without departing from the spirit and the scope of the invention and without diminishing its attendant advantages. It is therefore intended that such changes and modifications be covered by the following claims except insofar as limited by the prior art.

What is claimed is:

1. A method comprising: receiving,
at least one processor, an event from an event source;
in response to the receiving, determining two or more participants for a conference;
determining from the two or more participants, one or more decision makers;
creating a conference of the two or more participants;
in the conference, the at least one processor informing only the decision makers of a decision tree comprising a hierarchy of possible outcomes corresponding to a plurality of tree nodes, wherein the possible outcomes at tree nodes that are higher in the hierarchy, predetermine possible outcomes at tree nodes that are lower in the hierarchy;
in the conference, the at least one processor determining at least some of the participants' selections of the choices;
from the determined selections, the at least one processor determining an outcome, wherein the outcome is determined from the possible outcomes;
in response to determining the outcome, the at least one processor automatically causing a function of the outcome to be performed by an outcome sink;
wherein the event source and the outcome sink are each a separate and distinct entity from the at least one processor, the participants, and user terminals of the participants;
wherein determining by the at least one processor at least some of the participants' selections comprises determining by the at least one processor only the decision-makers' selections of the choices; and wherein determining only the decision-makers' selections of the choices comprises sending a message specifying the requester, a selection of one of the choices, and one of the decision-makers who made the one choice.

2. The method of claim 1 wherein: informing comprises sending a message specifying a requester of the conference, a list of the participants, and a subject of the conference.

3. The method of claim 2 wherein: determining at least some of the participants' selections comprises sending a message specifying a selection of one of the choices, and one of the participants who made the one choice.

4. The method of claim 1 wherein: informing comprises sending a message specifying a requester, a list of the participants, a list of the decision-makers, and a subject of the conference.

5. The method of claim 1 wherein:
the causing comprises transmitting the outcome to an outcome sink; and
in response to receiving the outcome, the outcome sink performing a process that is a function of the outcome.

6. A non-transitory computer-readable medium storing instructions which, when executed by a computer, cause the computer to perform the method of claim 1.

7. An apparatus comprising:
a conference service including a processor configured to create a conference of participants;
an interactive system including a processor configured to:
determine, from two or more participants, one or more decision makers;
inform, during the conference, only the decision-makers of a decision tree comprising a hierarchy of possible outcomes corresponding to a plurality of tree nodes, wherein the possible outcomes at tree nodes that are higher in the hierarchy predetermine possible outcomes at tree nodes that are lower in the hierarchy;
determine, during the conference, at least some of the participants' selections of the choices;
a processing entity configured to:
responsive to receipt of an event from an event source, cause the conference service to create the conference, and
responsive to an outcome of the conference, automatically cause an outcome sink to perform a function of the outcome, wherein the outcome is determined from the possible outcomes;
wherein at least one of the processing entity, the conference service, and the interactive system is configured to determine, responsive to the determined selections, the outcome from the determined selections;
the event source and the outcome sink are each a separate and distinct entity from the conference service, the processing entity, the interactive system, and user terminals of the participants;
wherein the conference service is for determining, during the conference, only the decision-makers' selections of the choices; and
wherein the conference service is adapted to send to the processing entity a message specifying the requester, a selection of one of the choices, and one of the decision-makers who made the one choice.

8. The apparatus of claim 7 wherein: the processing entity is responsive to the determined selections, for determining the outcome from the determined selections.

9. The apparatus of claim 7 wherein: the processing entity is adapted to send to the conference service a message specifying a requester of the conference, a list of the participants, a subject of the conference, and a decision list comprising the plurality of choices.

10. The apparatus of claim 9 wherein: the conference service is adapted to send to the processing entity a message specifying a selection of one of the choices, and one of the participants who made the one choice.

11. The apparatus of claim 7 wherein: the processing entity is further for sending to the conference service a message specifying a requester of the conference, a list of the participants, a list of the decision-makers, and a subject of the conference.

12. The apparatus of claim 7 wherein: the processing entity is adapted to transmit the outcome to an outcome sink to cause the outcome sink to perform a process that is a function of the outcome.

13. The apparatus of claim 7 wherein: the processing entity comprises a client.

* * * * *

UNITED STATES PATENT AND TRADEMARK OFFICE
CERTIFICATE OF CORRECTION

PATENT NO. : 8,478,819 B1  
APPLICATION NO. : 11/860692  
DATED : July 2, 2013  
INVENTOR(S) : Dennis C. Kornbluh Page 1 of 1

It is certified that error appears in the above-identified patent and that said Letters Patent is hereby corrected as shown below:

In the Claims:

Column 6, Line 39, please delete "at least" and insert --at at least-- therein.

Signed and Sealed this
Twenty-fifth Day of February, 2014

Michelle K. Lee
*Deputy Director of the United States Patent and Trademark Office*